United States Patent [19]

Uroshevich

[11] 4,300,538

[45] Nov. 17, 1981

[54] SOLAR ENERGY RECEIVERS

[75] Inventor: Miroslav Uroshevich, Cincinnati, Ohio

[73] Assignee: Alpha Solarco Inc., Cincinnati, Ohio

[21] Appl. No.: 52,089

[22] Filed: Jun. 25, 1979

[51] Int. Cl.³ .............................................. F24J 3/02
[52] U.S. Cl. .................................. 126/438; 126/439; 126/443
[58] Field of Search ................ 126/438, 439, 441, 443

[56] References Cited

U.S. PATENT DOCUMENTS

| | | | |
|---|---|---|---|
| 1,989,999 | 2/1935 | Niederle | 126/438 |
| 3,915,147 | 10/1975 | Rineer | 126/443 |
| 3,923,381 | 12/1975 | Winston | 126/439 |
| 4,002,160 | 1/1977 | Mather, Jr. | 126/443 |
| 4,059,093 | 11/1977 | Knowles et al. | 126/443 |
| 4,074,678 | 2/1978 | Posnansky | 126/443 |
| 4,211,211 | 7/1980 | Toomey et al. | 126/443 |

Primary Examiner—Samuel Scott
Assistant Examiner—Lee E. Barrett
Attorney, Agent, or Firm—Gary M. Gron

[57] ABSTRACT

The disclosure illustrates a solar energy collector of the focusing type where the beam component of solar radiation is reflected and focused along a focal axis. A heat conductive tube for heat exchange fluid is positioned along the focal axis. A cylindrical glass shell is formed around the tube and is evacuated to minimize convection losses. A pair of elements forming a Winston-Setti collector are positioned within the glass tube to collect and concentrate solar energy on the tube which would be otherwise lost in the shadow cast on the reflector by the receiver assembly.

3 Claims, 1 Drawing Figure

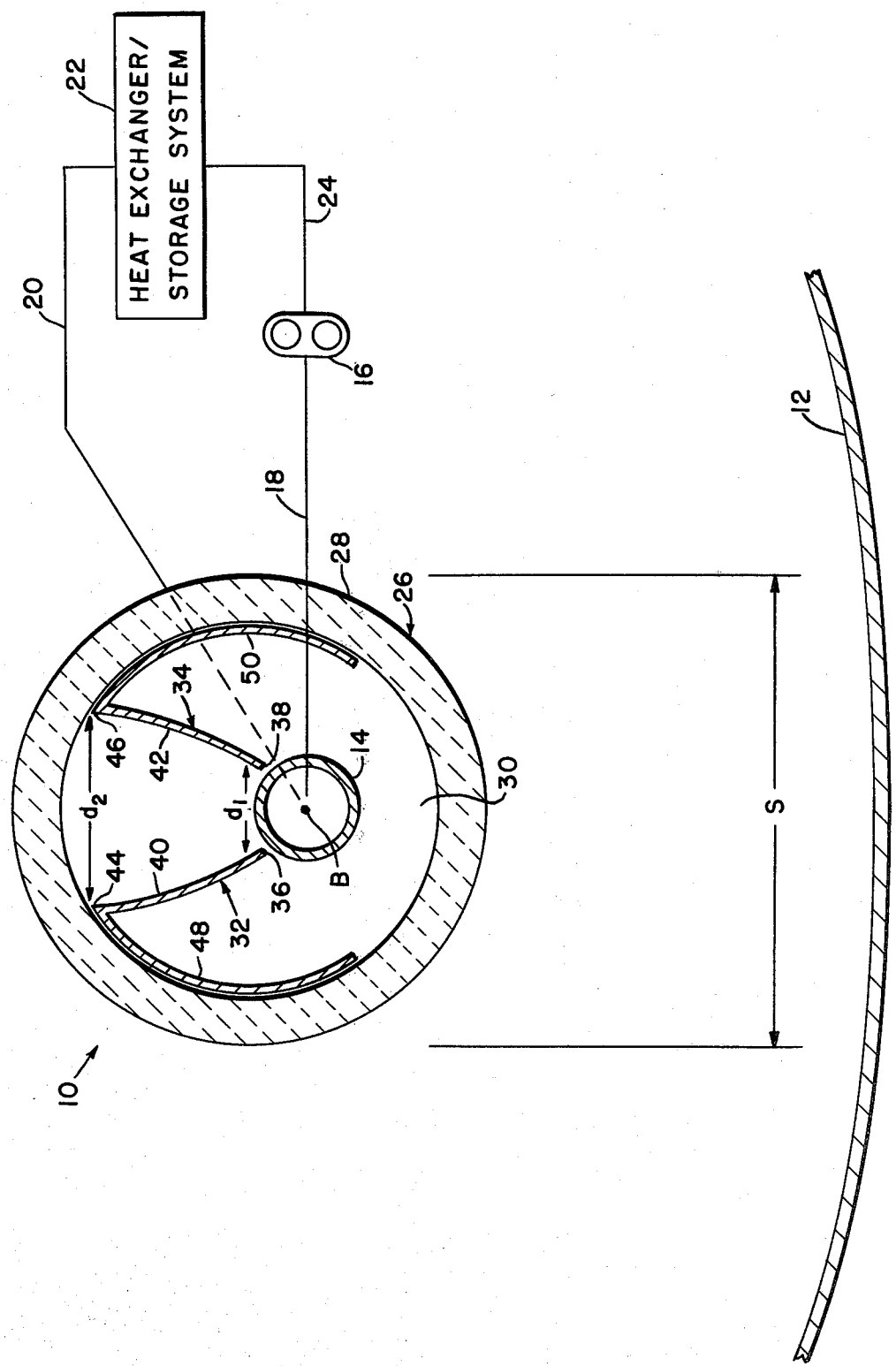

SOLAR ENERGY RECEIVERS

The present invention relates to solar energy receivers and more specifically to receivers used in focusing solar energy collectors.

Focusing solar energy collectors offer superior performance when compared to flat plate collectors. They enable much higher working fluid temperatures and experience much lower heat losses. One example of a focusing collector may be found in U.S. Pat. No. 2,205,378. It shows a reflector for concentrating solar radiation on a receiver positioned within a vacuum jacket to reduce radiation heat losses. One of the problems with such a collector, however, is that the receiver assembly casts a shadow on the reflector which prevents the reflector from concentrating a portion of the incident solar radiation. Although the receiver in U.S. Pat. No. 2,205,378 receives direct solar radiation on the side facing away from the reflector, this radiation is not in anyway concentrated and produces a temperature input to the receiver that is substantially lower than the input from the reflected and focused radiation thereby producing an inefficient heat input to the receiver. In later years, as shown by U.S. Pat. No. 4,078,549 the side facing away from the reflector has been heavily insulated thereby preventing even non focused radiation from striking the receiver.

The above problems are solved in accordance with the present invention in a solar energy collector having a reflector for receiving and focusing solar energy along a tubular receiver. A pair of opposed elements form substantially concave reflective surfaces between the source of solar radiation and the receiver to concentrate solar energy on the receiver that would otherwise be lost by the shadow cast on the reflector by the receiver.

The above and other related features of the present invention will be apparent from a reading of the following description of the disclosure shown in the accompanying drawing and the novelty thereof pointed out in the appended claims.

In the drawing, the sole FIGURE is a cross-sectional view of a solar energy collector having a receiver assembly which embodys the present invention.

In the description that follows, certain elements will be referred to as elongated although only a cross section is shown to simplify the description of the present invention. It should be apparent that the length of the elements may be selected according to the particular needs of the solar energy collector, and it may even be less than their width.

Referring to the FIGURE, there is shown a solar energy collector 10 comprising an elongated reflector element 12 which receives the beam component of solar radiation from a first direction A, and reflects and focuses it substantially along a focal axis B. An elongated tubular element 14 is positioned coaxial with axis B so that it receives and absorbs focused solar radiation. Tubular element 14 provides a passageway for a suitable heat transfer fluid. A pump 16 pressurizes the heat transfer fluid for delivery through a conduit 18 to tubular element 14, and then through a conduit 20 to a heat exchanger/storage system 22 where the heat energy is given up or stored according to the system needs. A conduit 24 completes the loop between pump 16 and heat exchanger/storage system 22.

The tubular element 14 is contained within a shell 26 that is transparent to solar radiation. Preferably shell 26 is formed from a glass cylinder 28 having integral end pieces 30 that sealingly engage element 14 to provide a gas tight seal. The interior of shell 26 is maintained at a subatmospheric pressure level and preferably a vacuum.

A pair of elongated sheet like element 32, 34 are positioned within shell 26 and have one of their edges 36, 38 respectively positioned adjacent element 14. Elements 32, and 34 define opposed reflective concave surfaces 40, 42 respectively. The other edges 44, 46 of elements 32, 34 are positioned adjacent to the interior wall of the glass cylinder 28. Preferably the concave surfaces are each formed in the shape of a parabolia having as its focus the edge of the opposing element that is adjacent to the element 14. Furthermore, the distance $d_1$ between the edges 36, 38 is substantially less than the distance $d_2$ between edges 44, 46. The configuration of the opposed elements 32, 34 is known in the art as a Winston-Setti collector and a complete description may be found in U.S. Pat. No. 3,923,381.

Attached to edges 44, 46 of elements 32, 34 are integral sections 48, 50 that are curved to conform to and abut the interior wall of glass cylinder 28, thus supporting elements 32, 34.

In operation, the beam component of solar radiation strikes reflector 12 and the rays are focused onto element 14 with a high intensity. The area bounded by the shadow S of the shell 26 prevents a portion of the solar radiation from being reflected onto element 14. However, the opposed concave reflective elements 32, 34 cause a substantial portion of the radiation directly striking the shell 26 from direction A to be reflected between them and concentrated on the portion of element 14 that faces away from reflector 12. Thus, element 14 receives concentrated solar radiation from two directions thereby greatly increasing its efficiency.

Although a preferred embodiment of the present invention has been described, it should be apparent to those skilled in the art that it may be practiced in different forms without departing from the spirit and scope thereof.

Having thus described the invention, what is claimed as novel and desired to be secured by Letters Patent of the United States is:

1. In a solar energy collector having an elongated reflector element receiving the beam component of solar radiation and reflecting and focusing it substantially along a focal axis positioned between the reflector and the source of solar radiation, the improvement comprising:

an elongated tubular receiver of heat conductive material positioned generally along said focal axis for absorbing solar radiation, said tubular receiver providing a passageway for heat transfer fluid that is heated as it flows therethrough and an elongated shell having substantially uniform wall thickness spaced from and surrounding said tubular receiver, said shell being transparent to solar radiation;

a pair of opposed elongated reflective elements having first edges adjacent said tubular receiver and second edges adjacent the interior wall of said shell, said reflective elements forming substantially concave reflective opposed surfaces within said shell to form therebetween a trap for solar radiation, which radiation is reflected between said surfaces and concentrated on said receiver, the distance between the second edges of said elements being greater than the distance between the first edges, the concave reflective surfaces each being formed in the shape of a parabola having as its focus the first edge of the other reflective surface;

each of said reflective elements having a curved integral section connected to the second edge thereof and conforming to said transparent shell, said curved sections being wide enough to position said reflective elements within said transparent shell and narrow enough to expose the tubular receiver directly to all the solar radiation reflected by said elongated reflector;

whereby the radiation that would be lost because of the shadow cast by said shell and tubular receiver is concentrated on and is absorbed by the portion of the receiver facing away from said reflector element.

2. Apparatus as in claim 1 wherein said shell forms a gas tight seal around said tubular elements and said opposed elements, the interior of said shell being maintained at a subatmospheric pressure.

3. Apparatus as in claim 2 wherein said shell has a cylindrical shape.

* * * * *